United States Patent
Bouche et al.

(10) Patent No.: US 7,565,725 B2
(45) Date of Patent: Jul. 28, 2009

(54) METHOD FOR FORMING A VARIABLE CAPACITOR

(75) Inventors: Guillaume Bouche, Portland, OR (US); Fabrice Casset, Tencin (FR); Pascal Ancey, Revel (FR)

(73) Assignees: STMicroeectronics S.A., Montrouge (FR); Commissariat a l'energie Atomique, Paris Cedex (FR)

( * ) Notice: Subject to any disclaimer, the term of this patent is extended or adjusted under 35 U.S.C. 154(b) by 200 days.

(21) Appl. No.: 11/512,731

(22) Filed: Aug. 30, 2006

(65) Prior Publication Data

US 2007/0087513 A1 Apr. 19, 2007

(30) Foreign Application Priority Data

Aug. 31, 2005 (FR) .................................. 05 52645

(51) Int. Cl.
 *H01G 7/00* (2006.01)
(52) U.S. Cl. ................... 29/25.42; 29/592.1; 29/832; 29/837; 29/842; 29/852; 83/29; 83/35; 83/36; 83/50; 361/311; 361/312; 361/313
(58) Field of Classification Search ............... 29/25.42, 29/592.1, 832, 837, 842, 852, 855; 83/29, 83/35, 36, 50; 361/311–313
See application file for complete search history.

(56) References Cited

U.S. PATENT DOCUMENTS

| 5,776,381 | A | * | 7/1998 | Haase ........................ 264/2.2 |
| 6,392,233 | B1 | | 5/2002 | Channin et al. |
| 6,499,217 | B1 | | 12/2002 | Yamada et al. |
| 7,082,024 | B2 | * | 7/2006 | Casset et al. ................ 361/277 |

FOREIGN PATENT DOCUMENTS

| EP | 1 536 439 A1 | 6/2005 |
| JP | 60127122 A * | 7/1985 |
| JP | 02261606 A * | 10/1990 |

OTHER PUBLICATIONS

French Search Report from French Patent Application 05/52645, filed Aug. 31, 2005.
European Search Report from corresponding European Application No. 06119891.

* cited by examiner

*Primary Examiner*—Paul D Kim
(74) *Attorney, Agent, or Firm*—Lisa K. Jorgenson; James H. Morris; Wolf, Greenfield & Sacks, P.C.

(57) ABSTRACT

A method for forming a variable capacitor including a conductive strip covering the inside of a cavity, and a flexible conductive membrane placed above the cavity, the cavity being formed according to the steps of: forming a recess in the substrate; placing a malleable material in the recess; having a stamp bear against the substrate at the level of the recess to give the upper part of the malleable material a desired shape; hardening the malleable material; and removing the stamp.

15 Claims, 3 Drawing Sheets

METHOD FOR FORMING A VARIABLE CAPACITOR

BACKGROUND OF THE INVENTION

1. Field of the Invention

The present invention relates to a method for forming a variable capacitor, and more specifically a variable capacitor such as that described in French patent application No. 0350911 of the applicant.

2. Discussion of the Related Art

The variable capacitor described in the above-mentioned patent application comprises a conductive layer covering the inside of a cavity formed at the surface of a substrate and a flexible conductive membrane placed above the cavity. According to an aspect of this variable capacitor, the cavity portion covered by the conductive layer has the shape of a groove such that its depth increases continuously from one of the groove edges to the groove bottom. Further, the conductive layer covers the inside of this groove portion at least up to one of its two edges that it may cover.

As described in the above-mentioned patent application, the method for forming such a variable capacitor comprises the forming in a substrate of a partly groove-shaped cavity, of covering the inside of the groove with a first conductive layer, of filling the cavity with a sacrificial portion, of forming on the sacrificial portion a bridge-shaped conductive strip bearing on the lateral groove edges, and finally of eliminating the sacrificial portion. The conductive strip forms a flexible conductive membrane that can deform to come closer or draw away from the conductive layer covering the inside of the cavity.

The forming in a substrate of an at least partly groove-shaped cavity may be performed in various ways such as described in the above-mentioned French patent application. Except for the method for forming a cavity by means of insulating spacers, the other described cavity-forming methods are relatively complex to implement and require a large number of operations. Further, each of these methods provides a cavity having, in cross-section, a groove shape with a well-determined profile without for it to be possible to obtain an "ideal" profile. Further, the shapes of the cavities obtained according to such methods are not homogeneous and depend, among others, on the density of cavities formed on the substrate.

SUMMARY OF THE INVENTION

An object of the present invention is to provide a method for manufacturing a variable capacitor comprising a conductive layer placed in a cavity having a desired shape.

Another object of the present invention is to provide such a method which is simple to implement.

The present invention provides a method for forming a variable capacitor comprising a conductive strip covering the inside of a cavity, and a flexible conductive membrane placed above the cavity, the cavity being formed according to the steps of: forming a recess in a substrate; placing a malleable material in the recess; having a stamp bear against the substrate at the recess level to give the upper part of the malleable material a desired shape; hardening the malleable material; and removing the stamp.

According to an embodiment of the above-described method for forming a variable capacitor, the hardening step comprises a heating step.

According to an embodiment of the above-described method for forming a variable capacitor, the malleable material is non-reticulated resin.

According to an embodiment of the above-described method for forming a variable capacitor, the stamp is obtained according to the method of: forming a cavity of desired shape in the upper portion of a substrate; depositing on the substrate a hardenable material; and separating the substrate and the hardenable material, the latter then forming a stamp.

According to an embodiment of the above-described method for forming a variable capacitor, a portion at least of the cavity has the shape of a groove, the upper substrate portions located close to the groove forming two edges, and the groove depth continuously increasing from one of the edges to the groove center.

According to an embodiment of the above-described method for forming a variable capacitor, the method further comprises the steps of: forming a first conductive strip covering the inside of the groove-shaped portion of the cavity, the first conductive strip extending at least up to one of the two edges of the groove that it may cover; forming a sacrificial portion in the cavity; forming an insulating strip on the sacrificial portion, substantially above the first conductive strip; forming a second conductive strip on the insulating layer; and eliminating the sacrificial portion.

According to an embodiment of the above-described method for forming a variable capacitor, the method further comprises, prior to the cavity forming, the forming of two conductive tracks in the upper portion of the substrate, said recess being placed between the two conductive tracks, and the first conductive strip extending on the substrate to cover one of the conductive tracks, and the second conductive strip extending on the substrate beyond the insulating strip to cover the other one of the conductive strips.

The foregoing object, features, and advantages, as well as others, of the present invention will be discussed in detail in the following non-limiting description of specific embodiments in connection with the accompanying drawings.

DETAILED DESCRIPTION

Figure 1A:
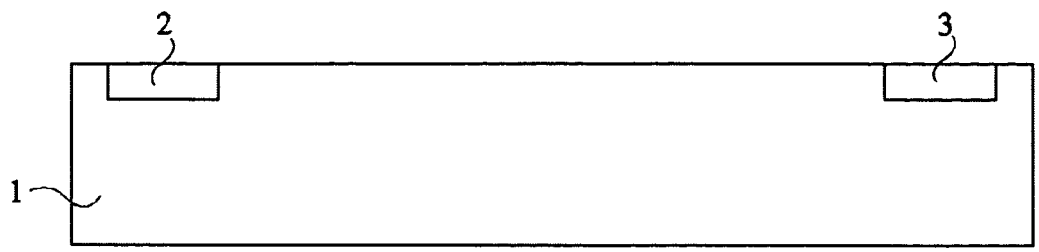
FIGS. 1A to 1J are cross-section views and FIG. 1J is a perspective view of structures obtained in successive steps of a variable capacitor manufacturing method according to the present invention.

For clarity, the same elements have been designated with the same reference numerals in the different drawings and, further, as usual in the representation of integrated circuits, the various drawings are not to scale.

The method for manufacturing a variable capacitor according to the present invention comprises a step of forming of a cavity according to a nanoimprint method using a previously-manufactured stamp. This nanoimprint method comprises the filling of a recess of a substrate with a malleable material, followed by the placing on the substrate of a stamp at the recess level and finally the hardening of the malleable material to set its shape. The material thus hardened comprises in its upper portion a cavity having a predefined shape corresponding to that of the stamp.

An example of a method for manufacturing a variable capacitor according to the present invention is described hereafter in relation with FIGS. 1A to 1J.

In an initial step, illustrated in FIG. 1A, conductive tracks 2 and 3 are formed in an insulating substrate 1, in openings of the upper portion of substrate 1.

Figure 1B:
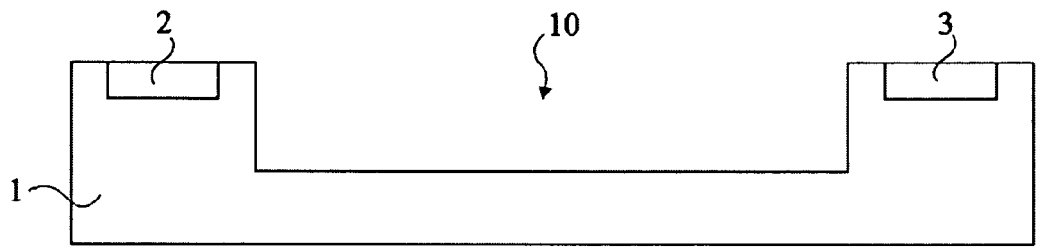

At the next step, illustrated in FIG. 1B, substrate 1 is etched to form a recess 10 in the upper portion of substrate 1 between conductive tracks 2 and 3. Recess 10 is in this example formed according to an anisotropic etch method so that the recess walls are substantially vertical. However, recess 10 may be formed according to an isotropic etch method.

Figure 1C:
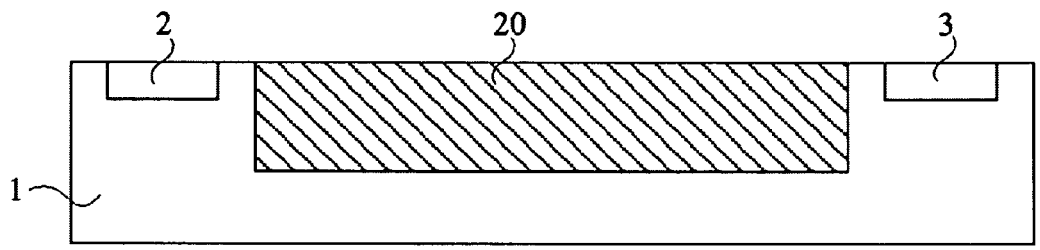

At the next step, illustrated in FIG. 1C, a malleable material 20 that can be subsequently hardened is placed in recess 10. Such a malleable material, for example, is non-reticulated resin.

Figure 1D:
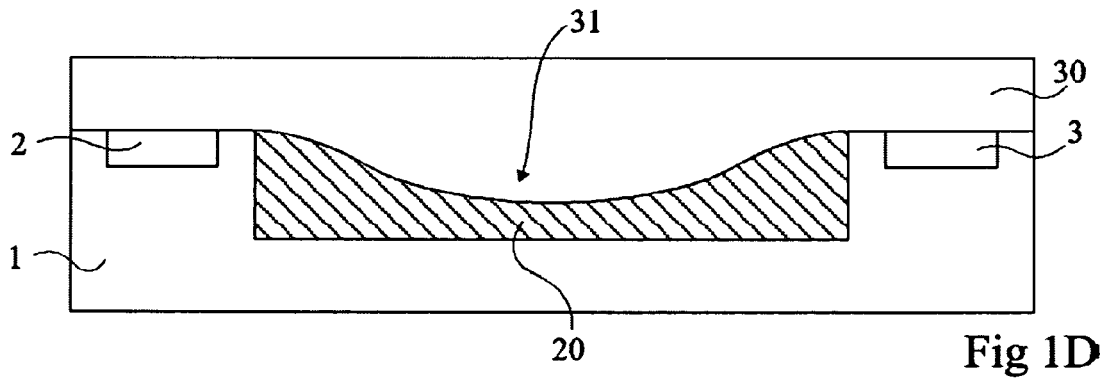

At the next step, illustrated in FIG. 1D, a stamp 30 is placed on substrate 1 at the level of recess 10. Stamp 30 is in this example a wafer portion exhibiting a bulged outgrowth 31 embedding in recess 10. This entire structure is then placed in a heating enclosure to harden material 20. Once material 20 has been hardened, stamp 30 is removed.

Figure 1E:
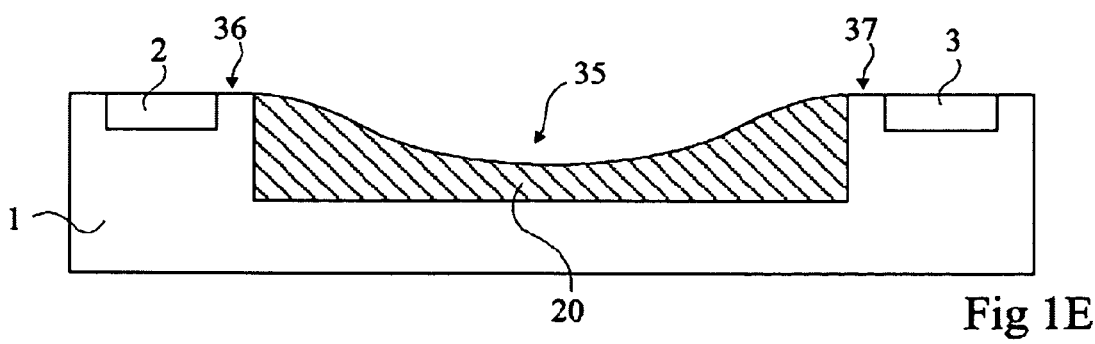

As visible in FIG. 1E, a portion of hardened material 20 then has, in cross-section, the shape of a groove 35. The upper portions of the substrate located between conductive tracks 2, 3 and groove 35 form two lateral edges 36 and 37. It should be noted that the depth of groove 35 continuously increases from one of edges 36, 37 to the center of groove 35.

Figure 1F:
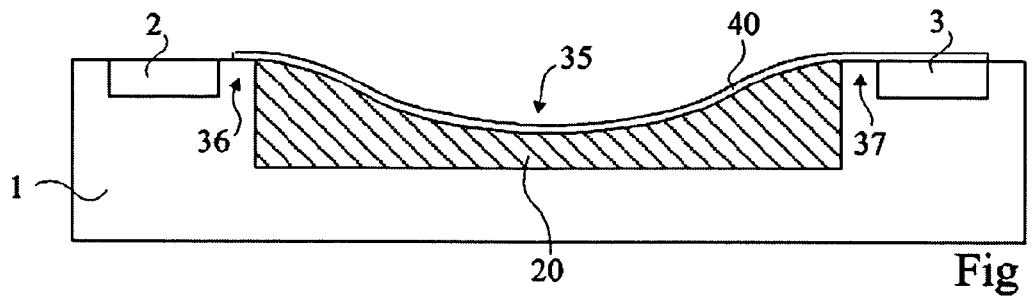

At the next step, illustrated in FIG. 1F, a conformal deposition of a conductive layer on the previously-obtained structure is performed. This conductive layer is then etched to keep a conductive strip 40 covering groove 35 and extending on edges 36, 37 to cover one of the conductive tracks, track 3 in this example.

Figure 1G:
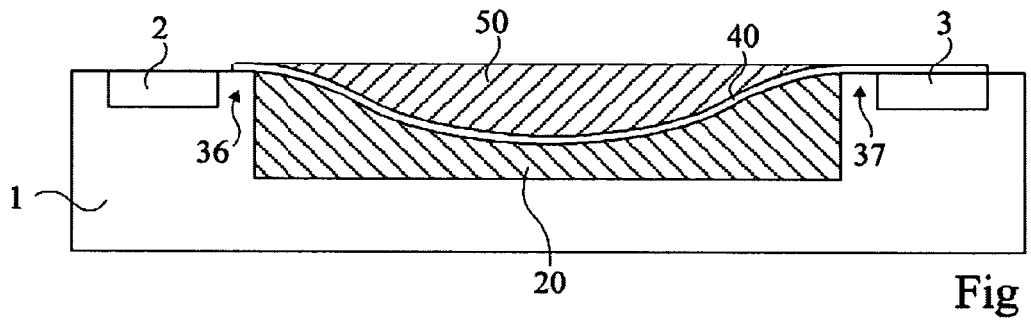

At the next step, illustrated in FIG. 1G, a sacrificial layer is deposited on the previously-obtained structure. The portions of the sacrificial layer located above substrate 1, conductive track 2, and conductive strip 40, outside of the previously-formed cavity are then eliminated. A sacrificial portion 50 placed in the previously-formed cavity is thus obtained. This partial elimination of the sacrificial layer may be performed by chem.-mech. polishing of the sacrificial layer to expose substrate 1, conductive strip 40, and conductive track 2, or according to a method of photolithographic etching of the sacrificial layer.

Figure 1H:
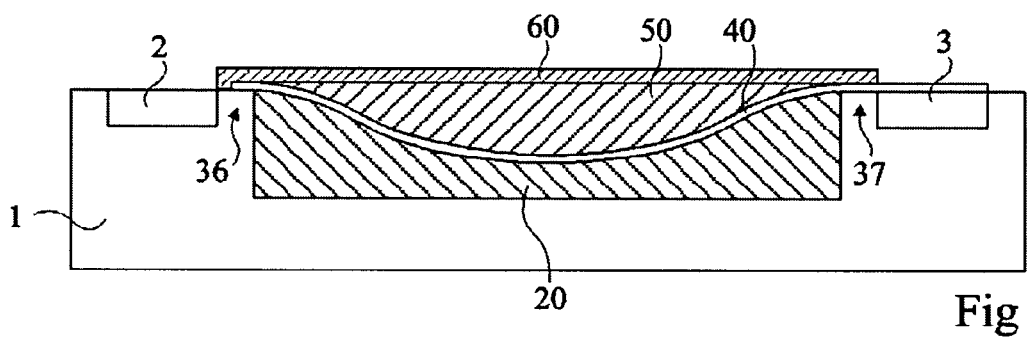
Figure 1I:
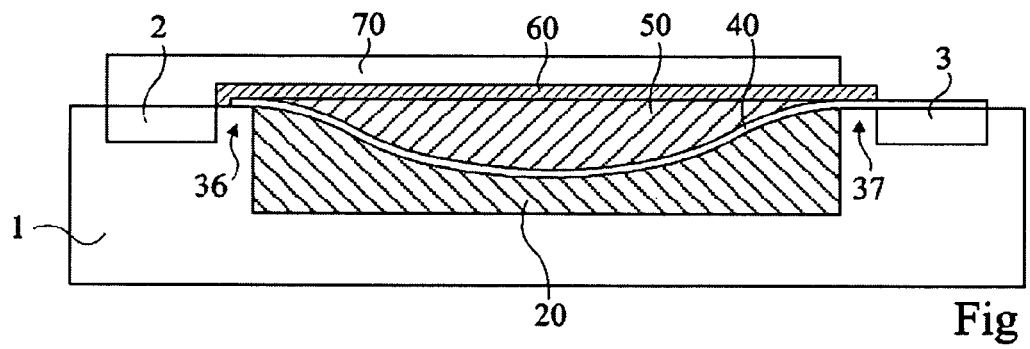

At the next step, illustrated in FIG. 1H, an insulating layer is deposited on the previously-obtained structure, then etched to keep an insulating strip 60 on sacrificial portion 50. Insulating strip 60 is placed substantially above conductive strip 40, transversely to groove 35 and extends on edges 36 and 37 of groove 35. The insulating strip extends above edges 36 and 37. Insulating strip 60 must not cover conductive track 2 but may extend above conductive track 3 on conductive strip 40.

At the next step, illustrated in FIG. 11, a conductive layer is deposited above the previously-obtained structure and etched to keep a conductive strip 70 covering conductive track 2 and insulating strip 60 up to edge 37 located close to the other conductive track 3.

Figure 1J:
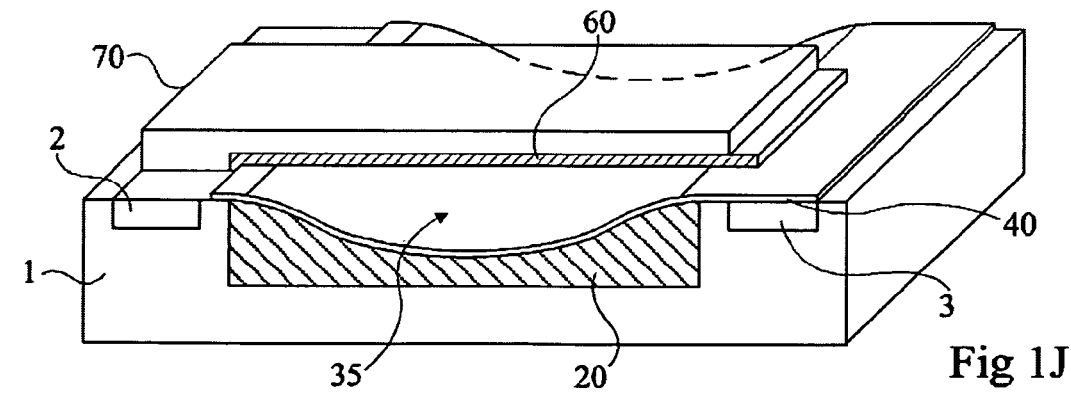

In a last step, illustrated in FIG. 1J, sacrificial portion 50 is eliminated according to an anisotropic etch method. Conductive strip 70 and insulating strip 60 are then "free" and can deform. Conductive strip 70 then forms a flexible conductive membrane. Conductive tracks 2 and 3 form terminals of application of a voltage between conductive strip 40 and conductive membrane 70 which form two electrodes of the variable capacitor thus formed. According to the applied voltage, conductive membrane 70 draws closer or moves away from conductive strip 40 and the capacitance of the capacitor increases or decreases.

Other variable-capacitor structures can be obtained by the method of the present invention. The terminals of application of a voltage between the capacitor electrodes may be formed differently, for example via contacts placed on conductive membrane 70 and on conductive strip 40. Further, insulating strip 60 may be placed on conductive strip 40 and not under conductive membrane 70.

Figure 2A:
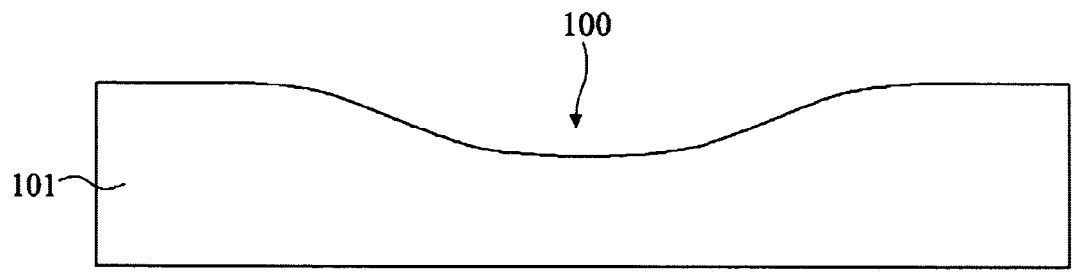
FIGS. 2A to 2C are cross-section views of structures obtained on manufacturing of a stamp used in a variable capacitor manufacturing method according to the present invention.
Figure 2B:
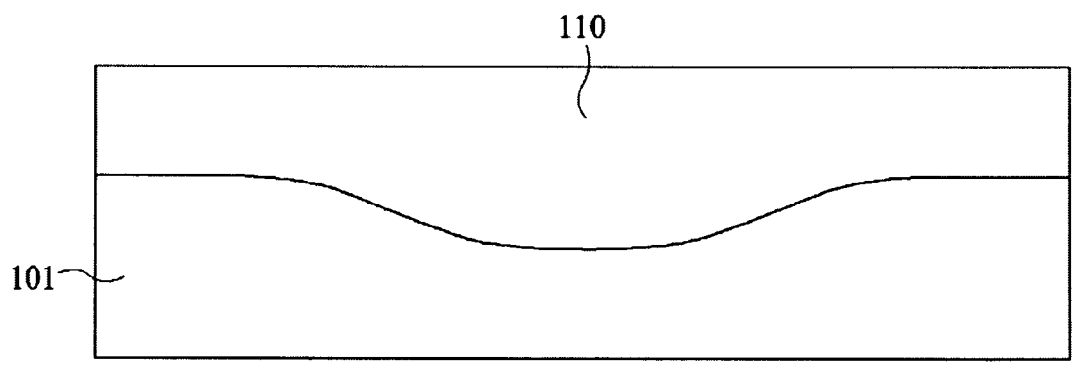
Figure 2C:
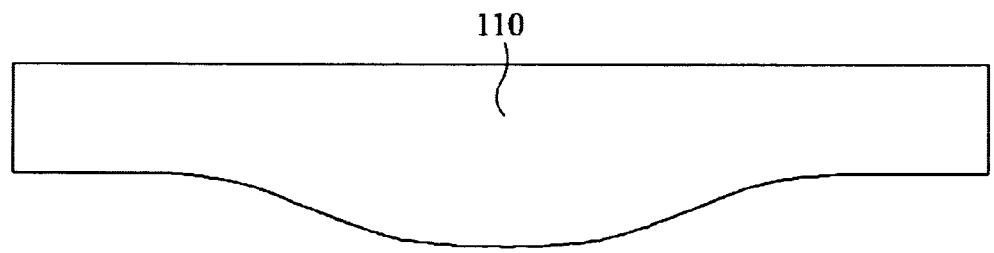

The stamp used in a manufacturing method according to the present invention can be obtained according to the following method, described in relation with FIGS. 2A to 2C.

In an initial step, illustrated in FIG. 2A, a cavity 100 is formed in the upper portion of a substrate 101, for example, made of silicon. Cavity 100 may be formed according to one of the methods described in the above-mentioned French patent application.

At the next step, illustrated in FIG. 2B, a material 110 such as nickel that can "harden" once deposited and then keep its shape when it is placed in a heated enclosure to heat up the malleable material used in the method according to the present invention, is deposited.

In a final step, illustrated in FIG. 2C, material 110 and substrate 101 are separated. Material 110 then forms a stamp that can be used to form the cavity of a variable capacitor manufactured according to the method of the present invention.

Of course, the present invention is likely to have various alterations, modifications, and improvements which will readily occur to those skilled in the art. In particular, those skilled in the art may devise other methods for hardening the malleable material.

Further, several variable capacitors may be formed in and above a same substrate according to the method of the present invention. Such capacitors may be of different sizes and shapes. To form the cavities in and above which the capacitors are then formed, a "stamp" plate comprising a set of stamps, identical or not, may be used, each stamp corresponding to bulged outgrowths of the plate.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for forming a variable capacitor that has a conductive strip covering an inside of a cavity, and a flexible conductive membrane placed above the cavity, wherein the formation of the cavity comprises:

forming a recess in a first substrate;

placing a malleable material in the recess;

stamping the malleable material into a desired shape with a stamp to define the inside of the cavity of the variable capacitor;

hardening the malleable material; and removing the stamp.

2. The method of claim 1, wherein hardening comprises heating.

3. The method of claim 1, wherein the malleable material is non-reticulated resin.

4. The method of claim 1, in combination with a method of forming the stamp for stamping the malleable material, wherein forming the stamp comprises:

forming a second cavity in a second substrate, the second cavity corresponding to the desired shape;

depositing a hardenable material into the second cavity; and separating the second substrate and the hardenable material, to form the stamp of the hardenable material.

5. The method of claim 1, wherein at least a portion of the cavity is groove-shaped with a pair of opposed edges, a depth of the groove continuously increasing from one of the edges to a center point of the groove.

6. The method of claim 5, further comprising:

forming the conductive strip covering at least a portion of the groove-shaped portion of the cavity, the first conductive strip extending at least up to one of the pair of edges;

forming a sacrificial portion in the cavity;

forming an insulating strip on the sacrificial portion, substantially above the first conductive strip;

forming the flexible conductive membrane on the insulating layer; and eliminating the sacrificial portion.

7. The method of claim 6, further comprising:

forming two conductive tracks in an upper portion of the substrate prior to forming the cavity, the recess being positioned between the two conductive tracks, wherein the first conductive strip extends on the substrate to cover one of the two conductive tracks, and the second conductive strip extends on the substrate beyond the insulating strip to cover the other one of the conductive tracks.

8. A method for forming a capacitor that has a variable capacitance, the method comprising:

forming a recess in a first substrate;

placing a malleable material in the recess;

forming the malleable material into a desired shape with a form to create a cavity of the capacitor the desired shape, corresponding to a first electrode formed in the cavity of the capacitor that has variable capacitance;

hardening the malleable material; and removing the form.

9. The method of claim 8, wherein hardening comprises heating.

10. The method of claim 8, wherein the malleable material is non-reticulated resin.

11. The method of claim 8, in combination with creating the form.

12. The combination of claim 11, wherein creating the form comprises:

forming a cavity in a second substrate, the cavity corresponding to the desired shape;

depositing a hardenable material into the cavity;

hardening the material; and separating the second substrate and the hardened material to create the form from the hardened material.

13. The method of claim 8, wherein the desired shape is a groove that extends from a first lateral edge of the recess towards a bottom of the recess and then to a second lateral edge of the recess opposed to the first lateral edge.

14. The method of claim 13, further comprising:

forming the first electrode on the groove;

forming a sacrificial portion next to the first electrode in the recess;

forming an insulating strip next to the sacrificial portion and spaced from the first electrode;

forming a second electrode next to the insulating layer; and then eliminating the sacrificial portion.

15. The method of claim 14, further comprising:

forming a first conductive track that lies adjacent to the first lateral edge and a second conductive track that lies adjacent to the second lateral edge, wherein the first electrode is in electrical communication with the first lateral edge and wherein the second electrode is in electrical communication with the second electrode.

* * * * *

UNITED STATES PATENT AND TRADEMARK OFFICE
CERTIFICATE OF CORRECTION

PATENT NO. : 7,565,725 B2  Page 1 of 1
APPLICATION NO. : 11/512731
DATED : July 28, 2009
INVENTOR(S) : Guillame Bouche et al.

It is certified that error appears in the above-identified patent and that said Letters Patent is hereby corrected as shown below:

Col. 3, line 55, should read:
At the next step, illustrated in FIG. 1I, a conductive layer is Signed and Sealed this First Day of September, 2009

David J. Kappos
*Director of the United States Patent and Trademark Office*